L. N. Bozem.
Saw Sharpener.
Nº 96,078.        Patented Oct. 26, 1869.
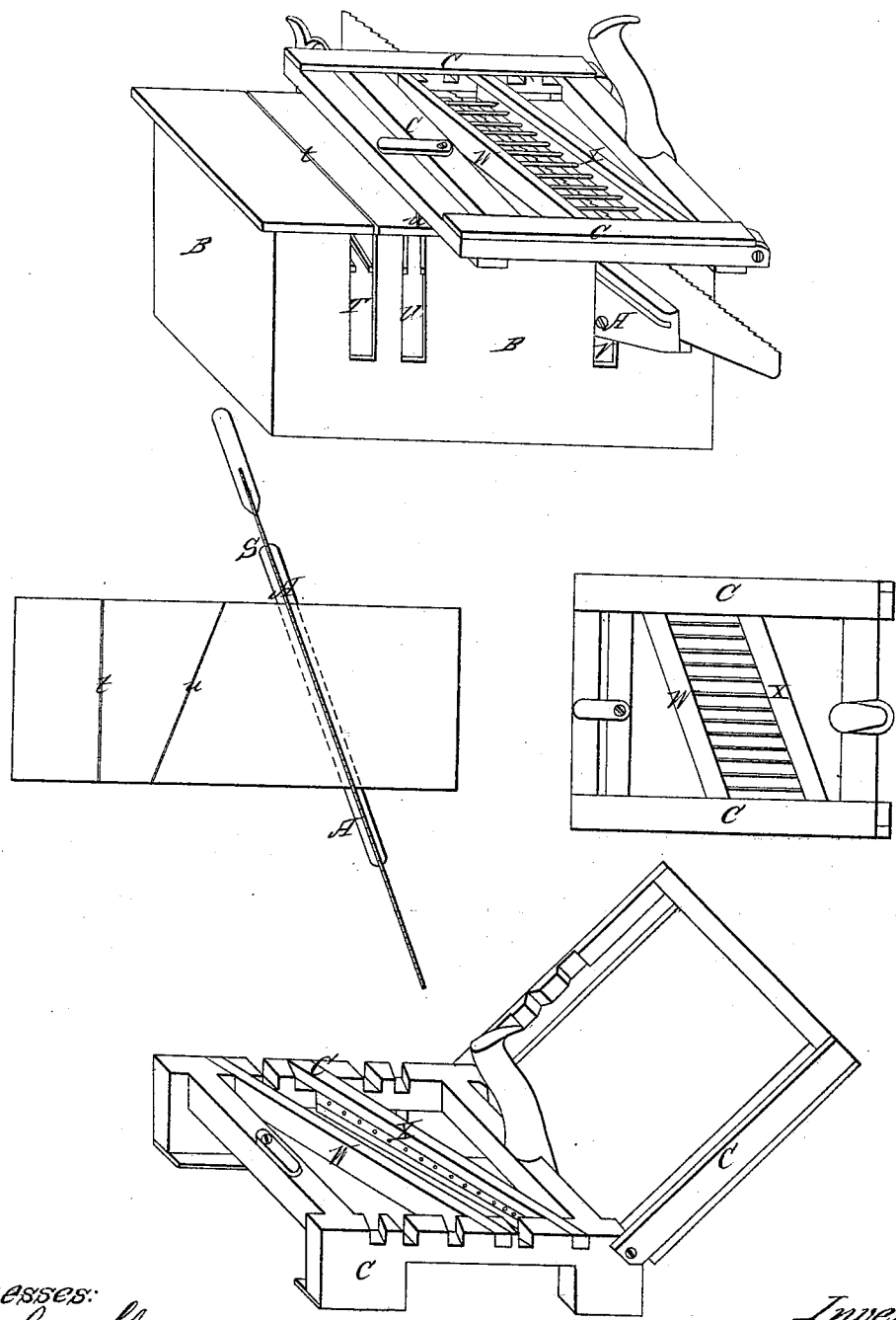
Witnesses:
P. S. Laughlin
J. W. Conrin
Inventor:
Levi N Bozem

United States Patent Office.

LEVI N. BOREM, OF KENNARD, OHIO.

Letters Patent No. 96,078, dated October 26, 1869.

IMPROVEMENT IN MACHINE FOR SHARPENING SAWS.

The Schedule referred to in these Letters Patent and making part of the same.

*To all whom it may concern:*

Be it known that I, LEVI N. BOREM, of Kennard, in the county of Champaign, in the State of Ohio, have invented a new and useful Machine for Sharpening and Dressing Hand-Saws and Wood-Saws; and I do hereby declare that the following is a full, clear, and exact description of the construction and operation of the same, reference being had to the annexed drawings, making a part of this specification.

Letter A is a saw-clamp, in which the saw is placed and firmly held, and shifted, as it is sharpened and dressed, by moving the clamp.

The length in full size is two and one-half feet.

The end marked S is to receive the handle of the hand-saw, while the teeth pass the thumb-screw and protrude between the pieces composing the clamp.

Letter B is the chest or frame, in which the clamp is inserted, and in full size is ten inches wide and two and one-half feet long.

The opening, marked $t$, is to receive the clamp when sharpening and dressing a wood-saw or rip-saw.

The middle opening, marked $u$, is to receive the clamp when dressing the left side of a hand-saw.

The opening marked $v$ is to receive the clamp when dressing the right side of a hand-saw.

Letter C is the saw-plane, which is shoved forward and drawn back, just as an ordinary carpenter's plane.

In full size it is ten inches from inside to inside of the frame, and twelve inches long.

The pieces marked $w$ and $x$ are the file-holders, in which twelve files are placed. The ends of the files are inserted in small cast-iron slides, which run in a groove in these pieces.

These cast-iron slides are punctured with holes at such intervals that the files can be set to correspond with the teeth in any sized saw.

There are to be twelve castings with each machine. The front castings are all punctured with a three-cornered hole.

These pieces $w$ and $x$ are held firmly in their places by means of the small mortises in the frame, and the clasp marked $y$, which fits over the frame, and is held down by a button, and thus holds the pieces $w$ and $x$ in their places.

I am aware that devices have been heretofore used for the purpose of sharpening saws by means of a series of files arranged within a frame, to which horizontal or vertical reciprocating motion is imparted.

I claim, therefore, and desire to secure by Letters Patent—

The combination and arrangement of the frame B, with its openings $t$, $u$, and $v$, for the reception of the clamp in which the saw to be filed is secured, with the saw-plane C, its clasp $y$, and file-holders $w$ and $x$, when constructed substantially as herein described.

LEVI N. BOREM.

Witnesses:
   J. S. LAUGHLIN,
   EDWD. CORWIN.